US007610110B1

(12) United States Patent
Johnston

(10) Patent No.: US 7,610,110 B1
(45) Date of Patent: Oct. 27, 2009

(54) GRAPHICALLY DISPLAYING STEREO PHASE INFORMATION

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 442 days.

(21) Appl. No.: 11/445,823

(22) Filed: Jun. 2, 2006

(51) Int. Cl.
*G06F 17/00* (2006.01)
*H04R 29/00* (2006.01)

(52) U.S. Cl. .......................................... 700/94; 381/58

(58) Field of Classification Search .................. 700/94; 381/56, 58; 324/76.77, 76.82, 612, 617; 73/645
See application file for complete search history.

(56) References Cited

U.S. PATENT DOCUMENTS 4,933,958 A * 6/1990 Brandl et al. ............... 375/331
5,117,440 A * 5/1992 Smith et al. ................. 375/328
5,479,522 A * 12/1995 Lindemann et al. ........ 381/23.1
6,021,204 A * 2/2000 Eastty ......................... 381/12
2005/0052457 A1* 3/2005 Muncy et al. ............... 345/440
2005/0226429 A1* 10/2005 Hollowbush et al. .......... 381/56

OTHER PUBLICATIONS www.Daisy2000.com, "Charts—Circular Histogram", Apr. 29, 2003, The Web Archive (www.archive.org), pp. 1-2, (http://web.archive.org/web/20030429112646/www.daisy2000.com/Daisy2003/zzprcircularhistogram.html).*

* cited by examiner

*Primary Examiner*—Cutis Kuntz
*Assistant Examiner*—Daniel R Sellers
(74) *Attorney, Agent, or Firm*—Fish & Richardson P.C.

(57) ABSTRACT

Systems, methods, and apparatus, including computer program products, are provided for displaying visual representations of features of audio data. In general, in one aspect, a computer-implemented method and computer program product is provided. Audio data are received. The audio data are separated into a plurality of samples. Stereo phase data is calculated for each sample of the plurality of samples. The calculated stereo phase data is displayed.

36 Claims, 12 Drawing Sheets

GRAPHICALLY DISPLAYING STEREO PHASE INFORMATION

BACKGROUND

The present disclosure relates to displaying visual representations of features of audio data.

Different visual representations of audio data are commonly used to display different features of the audio data. For example, a frequency spectrogram shows a representation of various frequencies of the audio data in the time-domain (e.g., a graphical display with time on the x-axis and frequency on the y-axis). Similarly, an amplitude display shows a representation of audio intensity in the time-domain (e.g., a graphical display with time on the x-axis and intensity on the y-axis).

Information associated with other features of the audio data can be used to interpret the audio data. For example, a stereo phase can be determined for the audio data. Stereo phase is a particular relationship between an amplitude of each audio channel (e.g., left and right) of stereo audio data. Each audio channel corresponds to a stream of audio data related to each other stream of audio data by a common time. The stereo audio data can also be described in terms of stereo width. Stereo width describes how much the stereo phase between samples of the audio data changes from an average stereo phase of the audio data (i.e., the correlation between audio channels, where the greater the correlation, the smaller the stereo width). A sample of audio data is an amplitude value of audio data at a point in time. Typically, samples are taken at a given sample rate (e.g., 44,100 samples per second for CD quality audio) in order to transform a continuous audio signal into a discrete audio signal.

One way of representing stereo phase information is with a Lissajous plot. The Lissajous plot is a visual representation of audio data of a stereo sample by plotting the amplitude of the left audio channel along the x-axis and the amplitude of the right audio channel along the y-axis. However, the Lissajous plot can be difficult to interpret visually, in part because the Lissajous plot displays the overall magnitude of each audio channel. Additionally, with complex audio data (e.g., audio data with a large stereo width), it can be difficult to visually interpret features of the audio data.

SUMMARY

Systems, methods, and apparatus, including computer program products, are provided for displaying visual representations of features of audio data. In general, in one aspect, a computer-implemented method and computer program product are provided. Audio data are received. The audio data are separated into a plurality of samples. Stereo phase data is calculated for each sample of the plurality of samples. The calculated stereo phase data is displayed.

Implementations can include one or more of the following features. Calculating the stereo phase data includes calculating a phase angle and magnitude for each sample. Calculating the phase angle for the sample includes calculating an inverse tangent associated with a ratio of an amplitude value of a left audio channel and an amplitude value of a right audio channel for the sample. Calculating the magnitude for a sample includes summing the squares of the amplitude values corresponding to a left audio channel and a right audio channel for the sample.

A histogram is generated for relating phase angles with a count using the stereo phase data calculated for each sample. The generated histogram can be displayed. Additionally, stereo phase data can be plotted using data from the generated histogram. Plotting the stereo phase data includes plotting a point for each phase angle having a radius from a center of the plot defined by the corresponding histogram count. The count for each phase angle in the histogram is a function of the number and magnitude of samples corresponding to the phase angle.

A center point for the plotted stereo phase data can be calculated and a visual representation of the calculated center point can be displayed. Calculating the center point includes calculating an average value of the plotted stereo phase data. The visual representation of the calculated center point includes an identifier indicating whether the audio data are generally in phase or out of phase. The identifier provides the visual representation of the center point with a first color if the audio data are generally in phase and a second color if the audio data are generally out of phase.

In general, in one aspect, a system is provided. The system includes means for receiving audio data. The system also include means for calculating stereo phase data for a plurality of samples, the stereo phase data comprising one or more phase angles and associated magnitudes and means for displaying the calculated stereo phase data.

In general, in one aspect, a system is provided. The system includes a graphical user interface configured to present a display of audio data. The graphical user interface includes a stereo field representing stereo phase between two or more audio channels as a function of phase angle and a plot of stereo phase including a plot of one or more phase angles calculated using a plurality of sample of the audio data.

Particular embodiments described in the present specification can be implemented to realize one or more of the following advantages. A stereo phase analysis display can be generated, which allows a user to interpret visually pan, stereo phase, and stereo width information associated with audio data at a particular instance in time. Additionally, the stereo phase analysis display allows the user to see changes in stereo phase, pan, and stereo width with respect to time. The user can use the information provided by the displays to analyze or edit the audio data.

The details of the various aspects of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
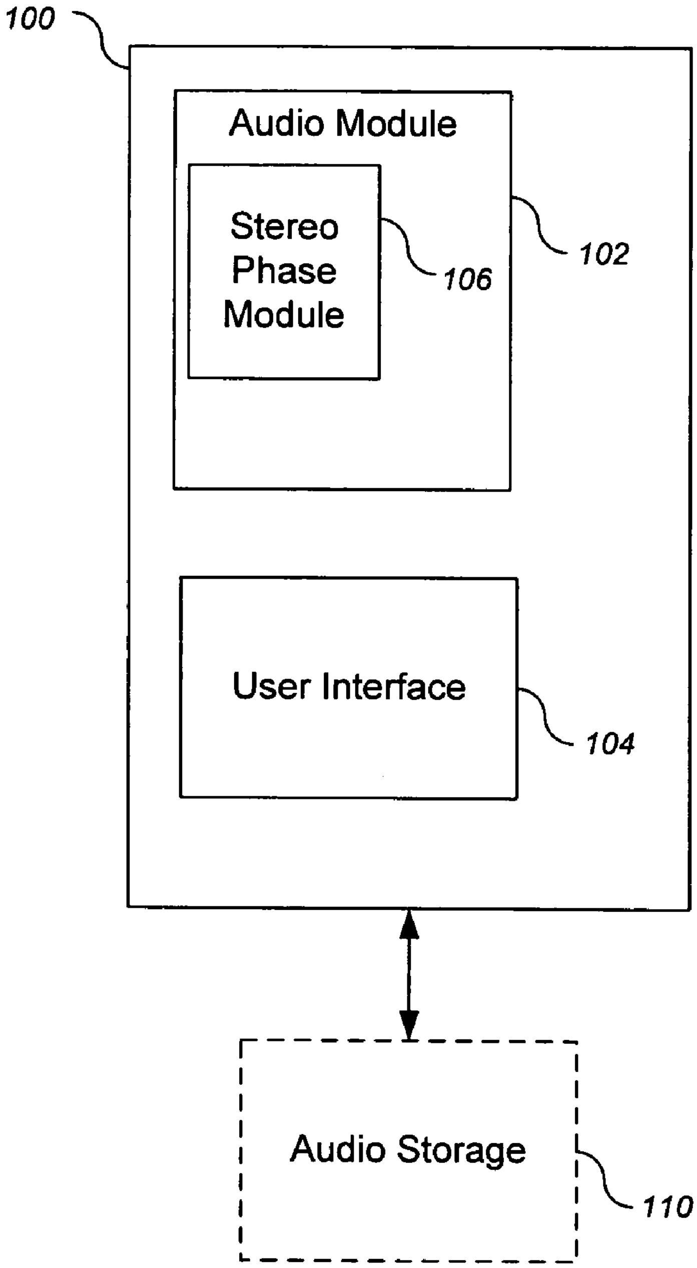
FIG. 1 is a block diagram of an example audio display system.

FIG. 1 is a block diagram of an example audio display system 100 for use in displaying audio data. The audio display system 100 includes an audio module 102, and a user interface 104. The audio module 102 includes a stereo phase module 106.

Audio module 102 analyzes a received audio file and extracts the audio data. Audio files can be received by the audio module 102 from audio storage within the audio system 100, from an external source such as audio storage 110, or otherwise (e.g., from within a data stream, received over a network, or from within a container document, for example, an XML document). The audio module 102 determines the form of the visual representation for displaying extracted audio data in the user interface 104. For example, the audio module 102 can make the determination in response to a user input or according to one or more default display parameters. The extracted audio data from the audio file can be displayed in a number of different forms including, for example, according to amplitude, frequency, pan position, and stereo phase.

Audio storage 110 can be one or more storage devices, each of which can be locally or remotely located. The audio storage 110 responds to requests from the audio editing system 100 to provide particular audio files to the audio module 102.

The user interface 104 includes a number of components. The components include one or more display components for displaying stereo phase data. The components also include one or more interactive components providing menus or tools allowing a user to interact with the user interface 104. For example, the display components can display a stereo phase plot of the audio data using information received from the stereo phase module 106. The interactive components of the user interface 104 allow the user to identify and request a particular audio file.

The stereo phase module 106 processes the audio data of an audio file to provide stereo phase data as described below. The stereo phase data can then be displayed by the display components of the user interface 104, for example, as a stereo phase plot. Additionally, the stereo phase module 106 processes the audio data such that the display components of the user interface 104 can display stereo phase data dynamically with time. As a result, the user interface 104 can display real-time stereo phase data.

Figure 2:
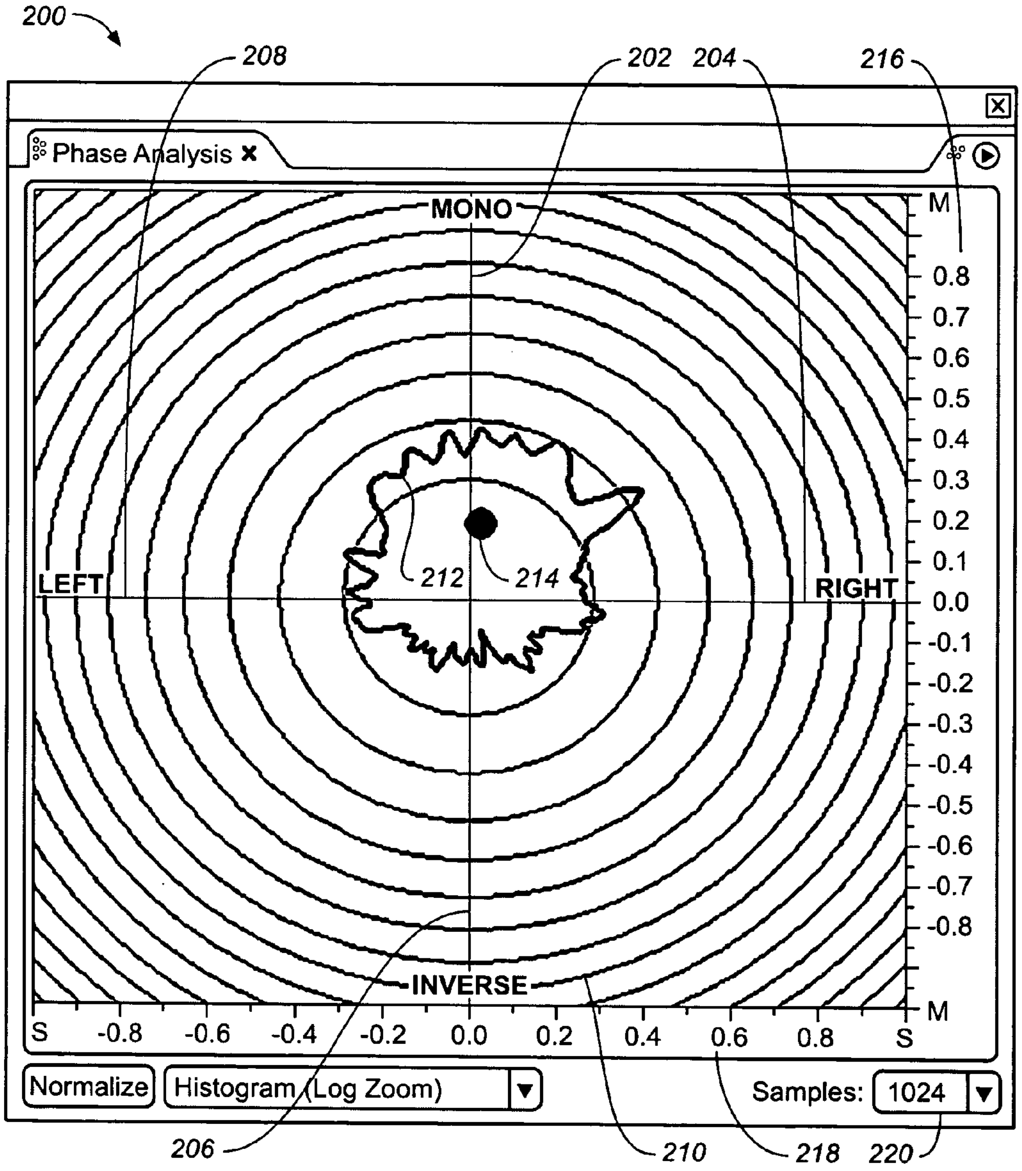
FIG. 2 shows an example stereo phase analysis display.

FIG. 2 shows an example stereo phase analysis display 200. The stereo phase analysis display 200 provides a stereo phase plot 212 of the audio data per unit time (e.g., for each tenth of a second). The stereo phase plot 212 can provide an individual snapshot in time or, alternatively, the stereo phase plot 212 can dynamically change with time (e.g., incrementally providing a stereo phase plot of the audio data for each tenth of a second). The stereo phase analysis display 200 plots the stereo phase of audio data in a phase circle. Using the phase circle allows the plotted audio data to provide intuitive information regarding the pan, stereo phase, and stereo width of the audio data in a single display.

In the stereo phase analysis display 200, the phase circle begins at the positive y-axis 202, representing 0 degrees. A point on the positive y-axis 202 indicates audio data that is in phase and centered, with both left and right stereo audio channels having identical amplitudes. Moving clockwise, the positive x-axis 204 represents 90 degrees. A point on the positive x-axis indicates audio data panned to the right. The negative y-axis 206 represents 180 degrees (or −180 degrees). A point on the negative y-axis 206 indicates audio data that is out of phase (e.g., amplitude of the left audio channel is the inverse of the amplitude of the right audio channel). The negative x-axis 208 represents 270 degrees (or −90 degrees). A point on the negative x-axis indicates audio data panned to the left. A particular phase angle in the stereo field for samples of the audio data can be calculated using amplitude information from each audio channel.

The stereo phase analysis display 200 also includes a set of concentric rings 210 from the center point of the display. The set of concentric rings 210 indicates the relative magnitude of the plotted audio data, where each point is plotted according to the magnitude of the audio data at a given phase angle in the stereo field (i.e., the radial distance to a point at a particular angle indicates the relative strength of the audio data at that stereo phase). FIG. 2 shows the concentric rings 210 as following a logarithmic scale to enhance detail illustrating changes in the audio data at lower magnitudes, however, other scales, including a linear scale, can be used. The set of concentric rings 210 are normalized such that the outermost ring represents maximum audio magnitude. For example, the outer most ring is plotted if all of the audio data from the left and right audio channels is 100 percent correlated (i.e., the stereo phase is constant for all samples of the audio data).

The stereo phase plot 212 includes points plotted for each phase angle calculated from the audio data over a particular time. The phase angles are calculated from samples of the audio data, where each sample provides amplitude data for each audio channel. The analysis of samples to calculate phase angle is described below. The stereo phase analysis display 200 also shows the number of samples 220 used to generate the stereo phase plot 212. Typically, a higher number of samples generate a higher resolution stereo phase plot. In the example stereo phase plot 212, 1024 samples of the audio data were used over a predetermined amount of time (e.g., a tenth of a second). In one implementation, the user can modify the number of samples 220 using a drop down menu.

The plotted points of the stereo phase plot 212 calculated using samples of the audio data are connected by a line to illustrate the stereo phase data. The stereo phase plot 212 shows a perimeter of the plotted points providing information regarding the audio data. Thus, the plotted area provides a shape to the audio data, which can be used to interpret the audio data. For example, in stereo phase plot 212, the shape of the stereo phase plot shows that the audio data are generally in phase and generally centered between the left and the right audio channels. Additionally, the area defined by the line of the stereo phase plot 212 geometrically indicates the stereo width of the audio data. In stereo phase plot 212, an example of a wide stereo width is shown. This indicates that there is a large variability in stereo phase between samples of the audio data from the average stereo phase of the samples.

Additionally, the stereo phase analysis display 200 includes a center point 214. The center point 214 represents the average of the plotted points in the stereo phase plot 212. The center point 214 provides a quick indication of whether the audio data are generally in phase or out of phase as well as pan direction according to which quadrant the center point is located.

Stereo phase analysis display 200 also includes reference scales 216 and 218, respectively, along the vertical and horizontal axes of the plot. The reference scales 216 and 218 are used as a reference for zooming in or out of the stereo phase plot 212. The displayed audio data in the stereo phase plot 212 is adjusted to correspond to user changes in the scale.

Figure 3:
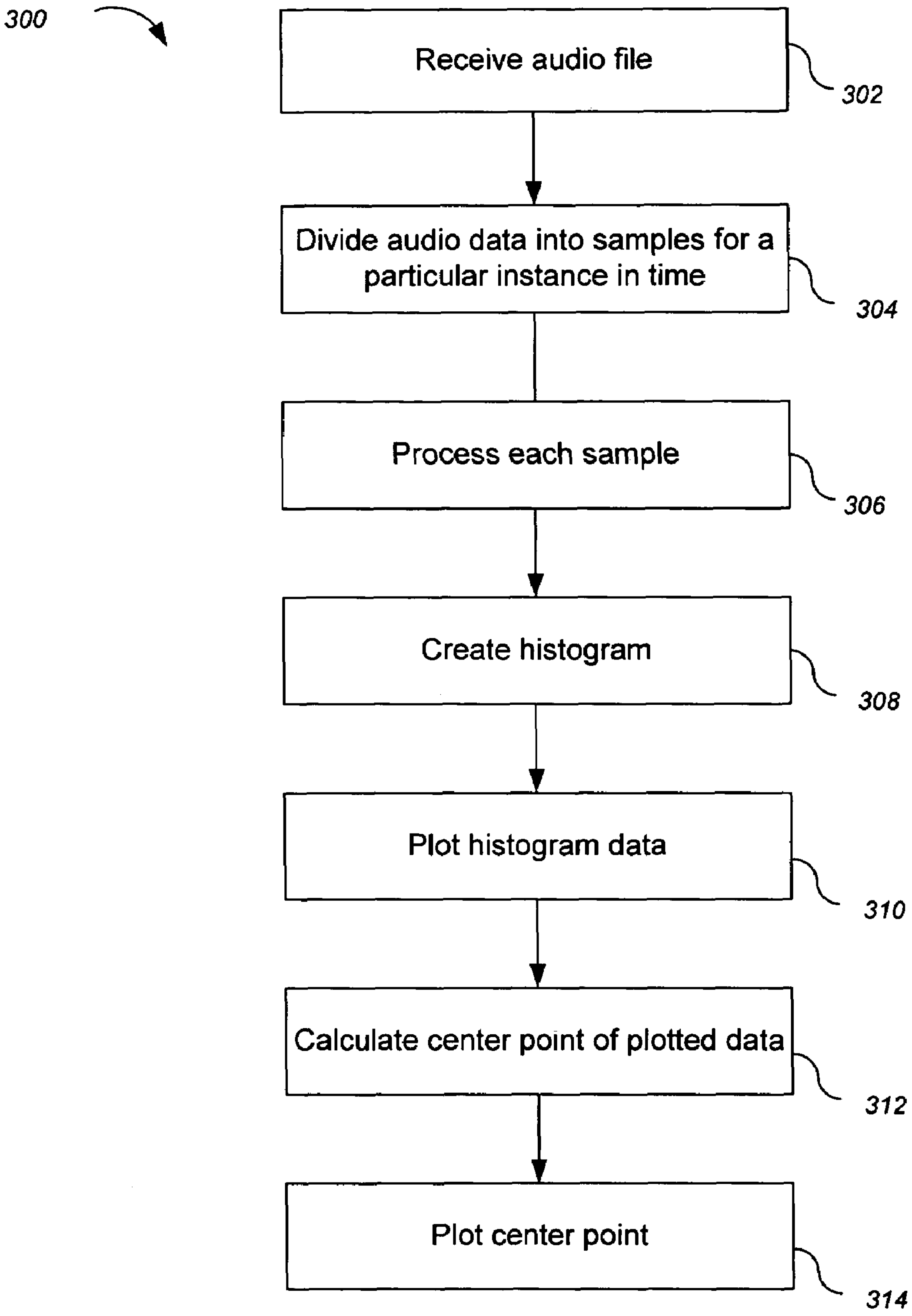
FIG. 3 shows an example process for generating a stereo phase display of audio data.

FIG. 3 shows an example process 300 for generating a stereo phase plot of audio data. For convenience, the process will be described with reference to a computer system that performs the process. The computer system receives an audio file (e.g., from audio storage 110) (step 302). The computer system receives an audio file, for example, in response to a user selection of a particular audio file.

For each predetermined period of time (e.g., a tenth of a second), the system separates the audio data into a number of samples (step 304). Each sample corresponds to a particular point in time based on the sampling rate (i.e., the number of samples taken over the predetermined time period). The number of samples used can vary, where a higher number of samples provide a greater resolution for the plotted audio data. In one implementation, 1024 samples are taken for each tenth of a second. Each sample includes an amplitude value for the audio data from each audio channel at the point in time of the sample. Thus, for audio data having a left and right audio channel, each sample includes a pair of values corresponding to the left and right audio channels.

The system processes each sample (step 306). Processing each sample includes calculating a phase angle and magnitude for each sample (step 306). The phase angle approximately represents the magnitude of the amplitude difference between audio channels of the sample. Thus, the phase angle provides a direction in the stereo field representing the stereo phase of the sample. The minimum stereo phase is represented at zero degrees and the maximum stereo phase is at 180 degrees (i.e., the greatest stereo phase amount between channels is when they are inverted).

The phase angle is computed by calculating a four-quadrant inverse tangent of the ratio of the amplitude between audio channels in the sample (e.g., a given sample can have an amplitude value for the left audio channel and an amplitude value for the right audio channel). Therefore, arctan (y/x) can be used to identify the particular quadrant of the resultant phase angle between −180 to 180 degrees. The calculated phase angle corresponds to the values of the stereo field represented by the stereo phase analysis display shown in FIG. 2. Thus, a calculated phase angle of zero degrees corresponds to the positive y-axis of the stereo phase analysis display.

The magnitude for each sample is also calculated. In a two channel implementation, the magnitude is calculated by summing the squares of the left and right audio channel amplitude values for the sample (e.g., Magnitude=R*R+L*L).

The system generates a histogram using the calculated data for each sample (step 308). Specifically, the histogram relates the phase angles with the number of samples having each particular phase angle. The histogram identifies which, and how many, samples have a particular phase angle. For example, multiple samples can have the same calculated phase angle, while other samples can be the only sample having a particular phase angle. Thus, for example, mono audio data corresponds to audio data where every sample has the same phase angle. Thus, mono data can have any phase angle (e.g., can be panned to either side or centered) as long as the phase angle is the same for all samples.

Each phase angle of the histogram has a count associated with the number of samples having that calculated phase angle. Additionally, the calculated magnitude can be used to weight the count for each phase angle of the histogram. Thus, the count of the histogram need not be a simple count of the number of samples having a given phase angle. Consequently, a small number of samples at a particular phase angle, but having a high magnitude, can have a large effect on the histogram count for that phase angle (e.g., indicating a strong audio signal at a particular phase angle). Thus, weighting the histogram accounts for the relative strength of samples.

The system uses the histogram data to generate a plot of stereo phase (step 310). Essentially, the histogram results in a set of polar coordinates which can be plotted, for example, in the stereo field described in FIG. 2. For each phase angle in the histogram, the count provides the radial distance along that phase angle from the center of the plot. Thus, a point is plotted for each phase angle of the histogram, where the radius from the center to that point is plotted according to the histogram count. The plotted points are connected, for example by a generated line, in order to illustrate the plotted points as a single stereo phase plot. In an alternative implementation, the histogram itself is displayed.

In one implementation, a center point (e.g., the geographic center) of the plotted audio data is calculated and plotted. The center point is calculated by calculating the average for all of the plotted points in the stereo phase plot (step 312). This average of the plotted phase angles and radii values is plotted in the stereo phase analysis display in order to indicate the general tendency of the audio data as a whole (step 314). For example, the center point can indicated that the audio data as a whole tends to the right or the left panning according to the quadrant of the center point.

Additionally, the center point indicates whether the audio data as a whole is in or out of phase. In one implementation, the distance from the center of the plot to the plotted center point is magnified (e.g., by a factor of three), in order to increase the visibility of the center point's quadrant (i.e., to avoid uncertainty when the center point is near the center of the stereo phase analysis display). The center point can also visually indicate information about the nature of the plotted audio data. For example, the center point can be associated with one or more particular colors that indicate whether the audio data, overall, are in phase (e.g., colored green) or out of phase (e.g., colored red).

Figure 4:
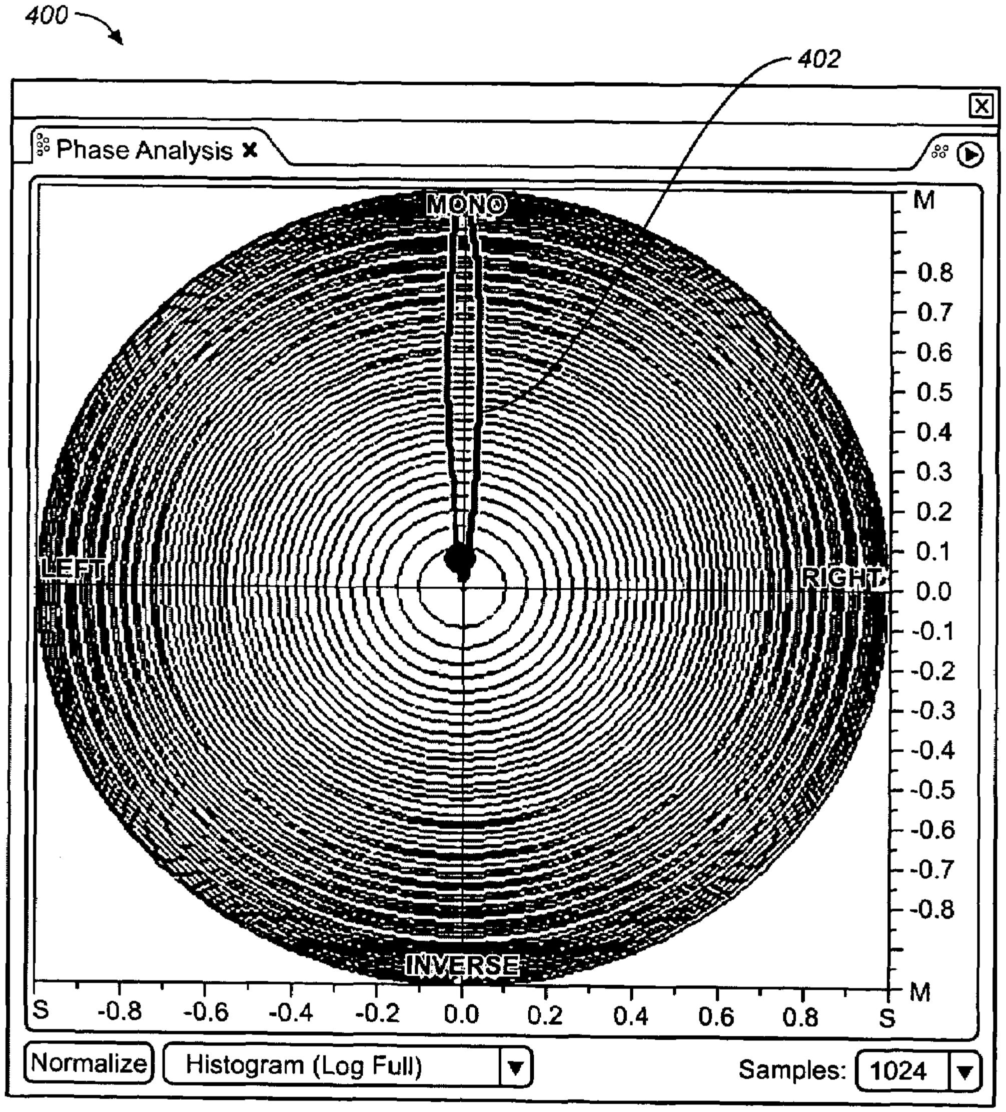
FIGS. 4-11 show example stereo phase analysis displays of audio data.

FIG. 4 shows an example stereo phase analysis display 400. In stereo phase analysis display 400, a stereo phase plot 402 of the audio data is shown. The stereo phase plot 402 shows that the audio data are centered (plotted at zero degrees) indicating that the stereo phase is zero and that the amplitude of both audio channels are identical. Therefore, the audio data are equally panned as shown in FIG. 4. Additionally, the stereo phase plot 402 indicates mono audio data because the plotted point is on the outermost magnitude ring at a single phase angle (i.e., all the samples have the same phase angle value in the histogram). Additionally, since the audio is identical in each audio channel, the stereo width is zero (i.e., the phase angle is constant for all samples; therefore there is no variability in stereo phase in any of the samples from an average stereo phase value).

The stereo phase plot 402 shows some apparent stereo width because of a smoothing applied to the histogram data. The smoothing can include moving some of the sample results to adjacent phase angles in the histogram for the purpose of increasing the visibility of the stereo phase plot 402. Alternatively, a zero stereo width can be plotted using a straight ray line at the calculated phase angle. In either case, the stereo width is zero when all of the samples have the same phase angle.

Figure 5:
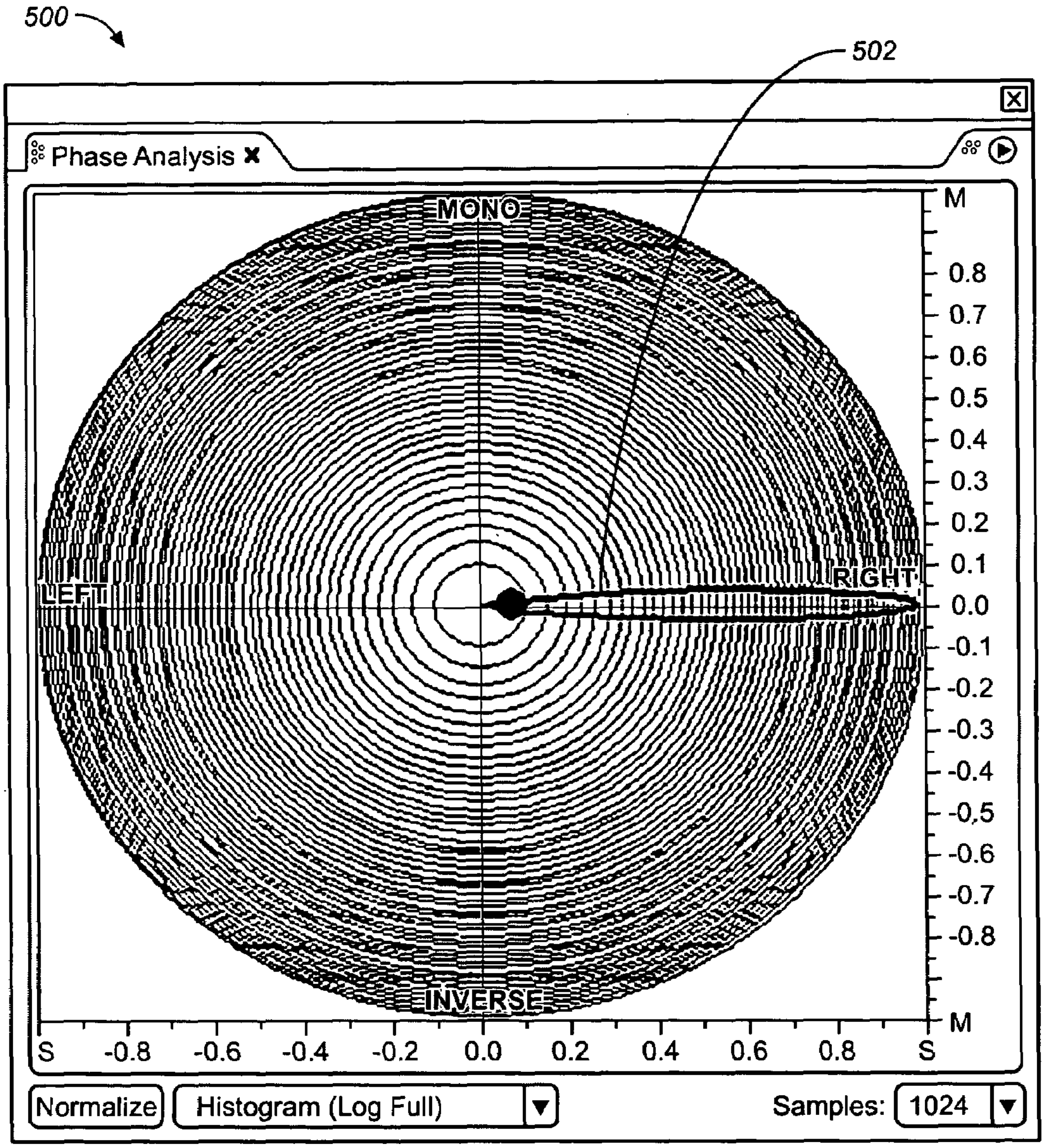

FIG. 5 shows an example stereo phase analysis display 500. In stereo phase analysis display 500, a stereo phase plot 502 of the audio data is shown. The stereo phase plot 502 indicates mono audio data, again indicated by a point plotted on the maximum concentric ring of the stereo phase analysis display 500. However, in this example, audio data are only in the right stereo audio channel, while the left stereo audio channel has zero audio data. Additionally, while there is a difference between the audio channels, the difference is constant, resulting in a single stereo phase angle. As a result, the stereo phase plot shows the audio data panned to the right (−90 degrees). Again, since all the audio is identically directed to a single phase angle, the amplitude of the audio data is presented as reaching the maximum circle of the plot. As with the stereo phase plot 400 of FIG. 4, the stereo width is technically zero, however, the plot is shown as having some narrow width due to applied smoothing functions. Thus, as illustrated by FIGS. 4 and 5, the stereo width can be zero both when the audio data in each audio channel is identical and when the audio data are different between the audio channels as long as the difference between the audio channels is constant.

Figure 6:
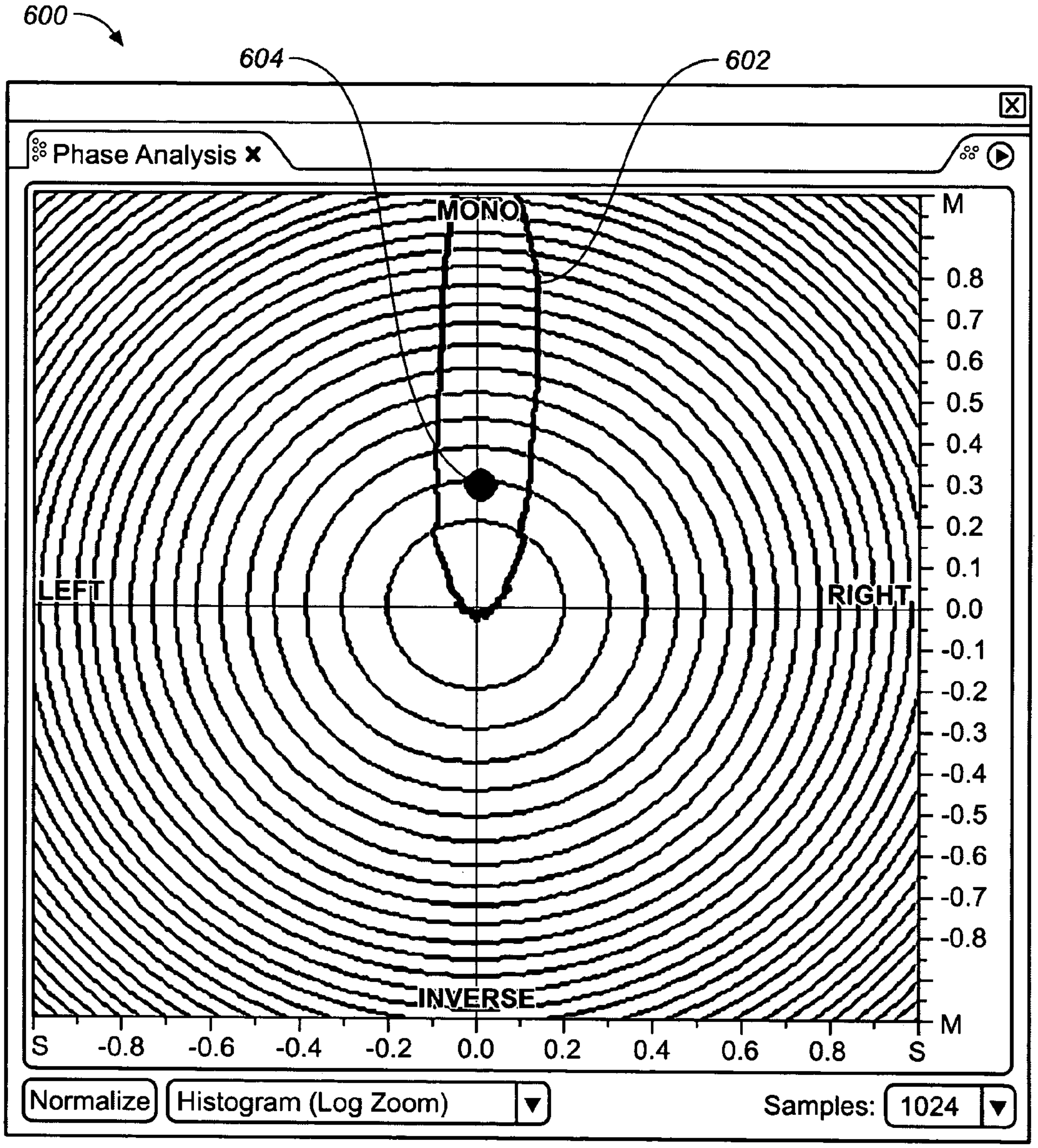

FIG. 6 shows an example stereo phase analysis display 600. In stereo phase analysis display 600, a stereo phase plot 602 is shown. The stereo phase plot 602 shows that the audio data are centered and has a narrow stereo field. The stereo phase plot 602 corresponds to an example of audio data having a strong central sound with a stereo background. Thus, while the majority of the audio data are correlated between the left and right audio channels, there is some variation in the stereo phase between the left and right audio channels resulting in some stereo width. A center point 602 showing the average value of the stereo phase plot 602 shows that the audio data are centered between the left and right pan positions.

Figure 7:
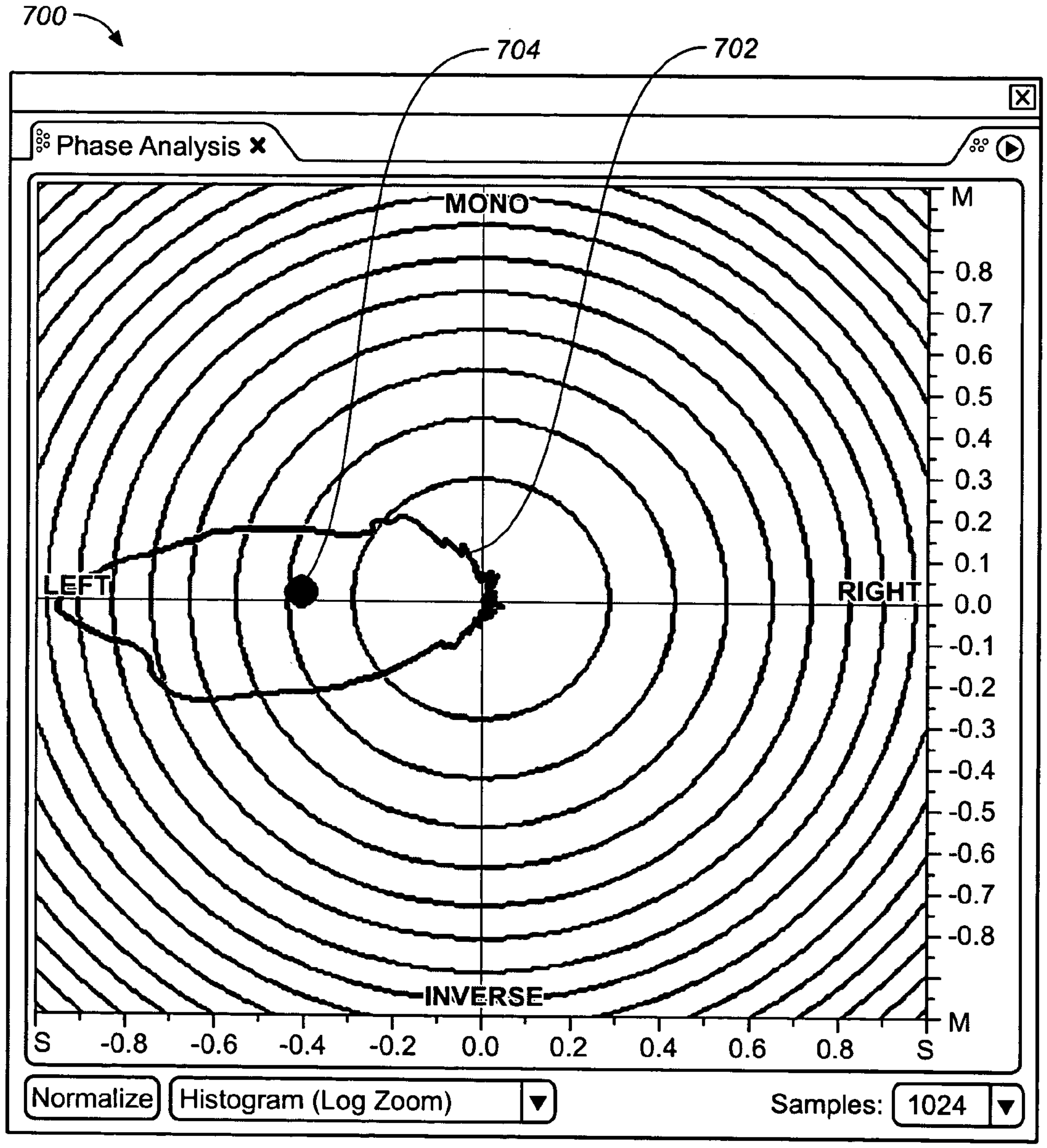

FIG. 7 shows an example stereo phase analysis display 700. In stereo phase analysis display 700, a stereo phase plot 702 of the audio data is shown. The stereo phase plot 702 shows that the audio data are panned to the left, but also includes a typical degree of stereo width. In this example, the audio data have a strong signal in the left stereo field, but it is not a mono signal. The stereo width shows that there is some correlation of the left and right audio channels between zero and 100 percent. The position of a center point 704 in the stereo phase plot 702 indicates that the audio data are panned to the left, but that the audio data is also equally in phase and out of phase.

Figure 8:
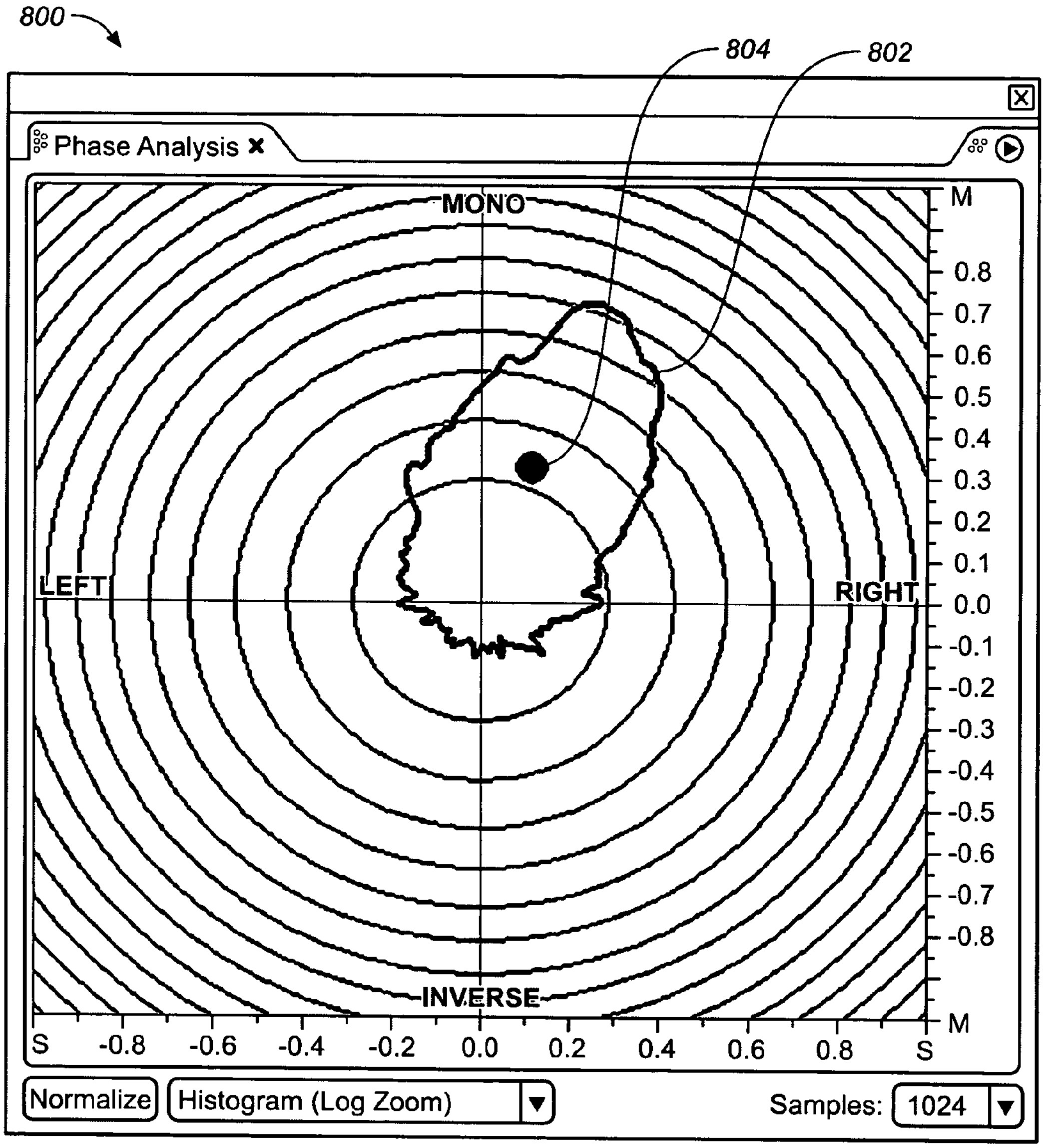

FIG. 8 shows an example stereo phase analysis display 800. In the phase analysis display 800, a stereo phase plot 802 of the audio data is shown. The stereo phase plot 802 shows that the audio data are predominantly in phase and panned slightly to the right. The stereo phase plot 802 also shows that the audio data has a normal stereo width. Additionally, a center point 804 shows that the average audio data is panned slightly to the right.

Figure 9:
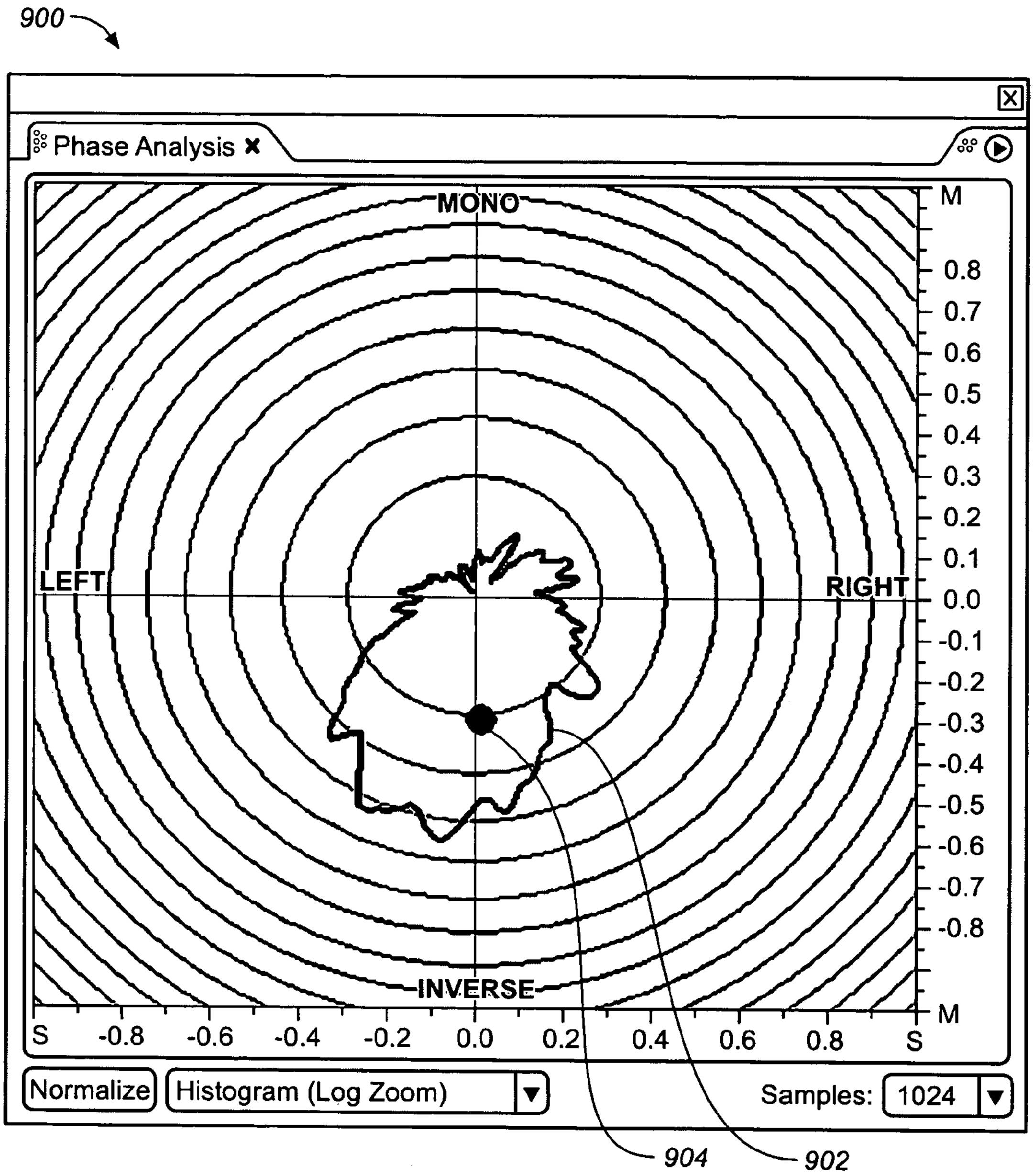

FIG. 9 shows an example stereo phase analysis display 900. In the stereo phase analysis display 900, a stereo phase plot 902 of the audio data is shown. The stereo phase plot 902 shows that the audio data have a wide stereo field, however in this example the audio data are predominantly out of phase. Additionally, a center point 904 shows that on average the audio data are centered but clearly out of phase (i.e., the audio data of one audio channel are predominantly inverted from the other audio channel).

Figure 10:
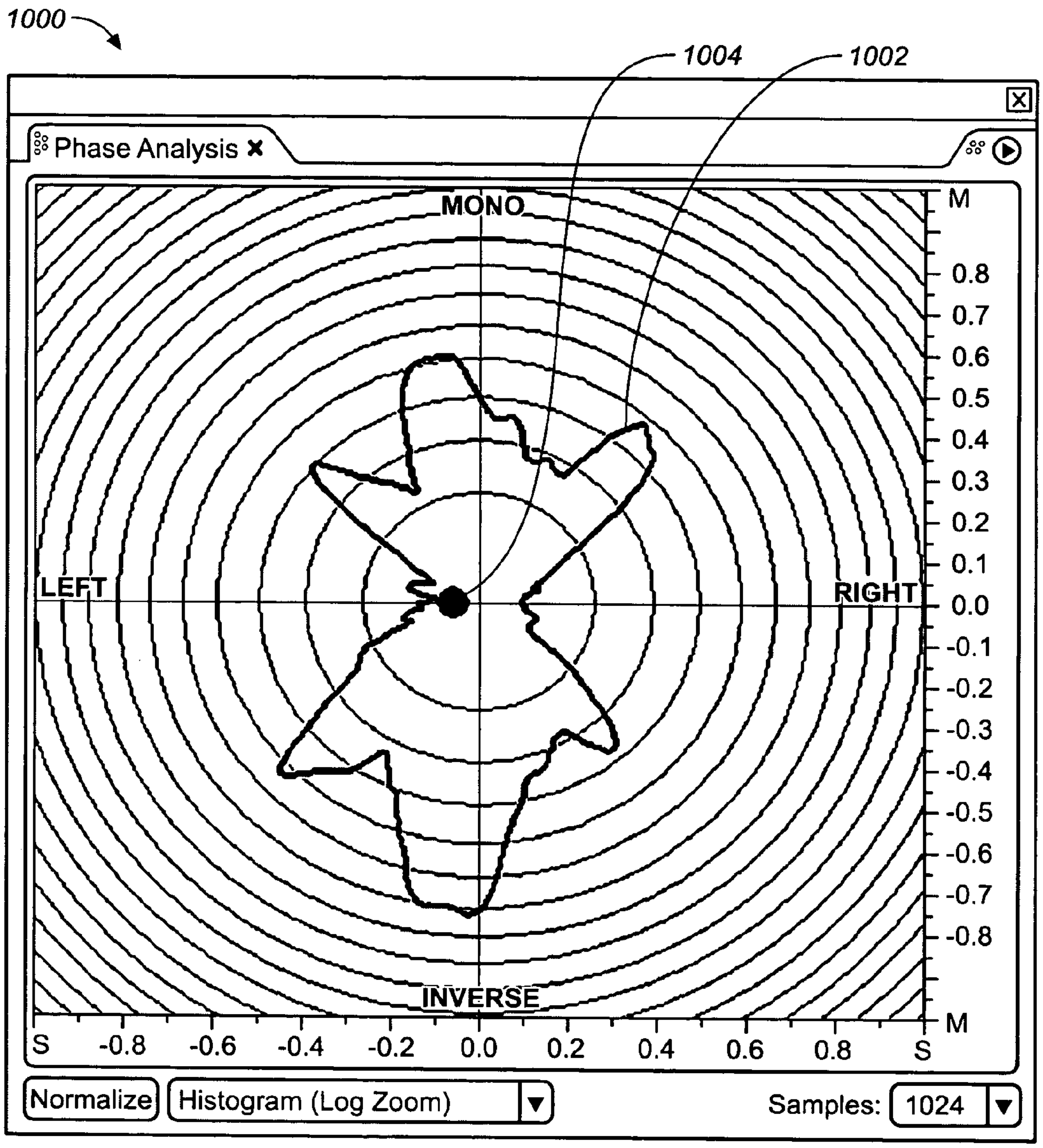

FIG. 10 shows an example stereo phase analysis display 1000. In the stereo phase analysis display 1000, a stereo phase plot 1002 of the audio data is shown. The stereo phase plot 1002 shows that the audio data includes samples having phase angles that are both in phase and out of phase. However, overall, as shown by center point 1004, the audio data are neither predominantly in phase or out of phase and the audio data are panned slightly to the left. The stereo phase analysis display 1000 presents an example of how the center point 1004 reveals overall information about the audio data that is not obviously apparent by the stereo phase plot 1002.

Figure 11:
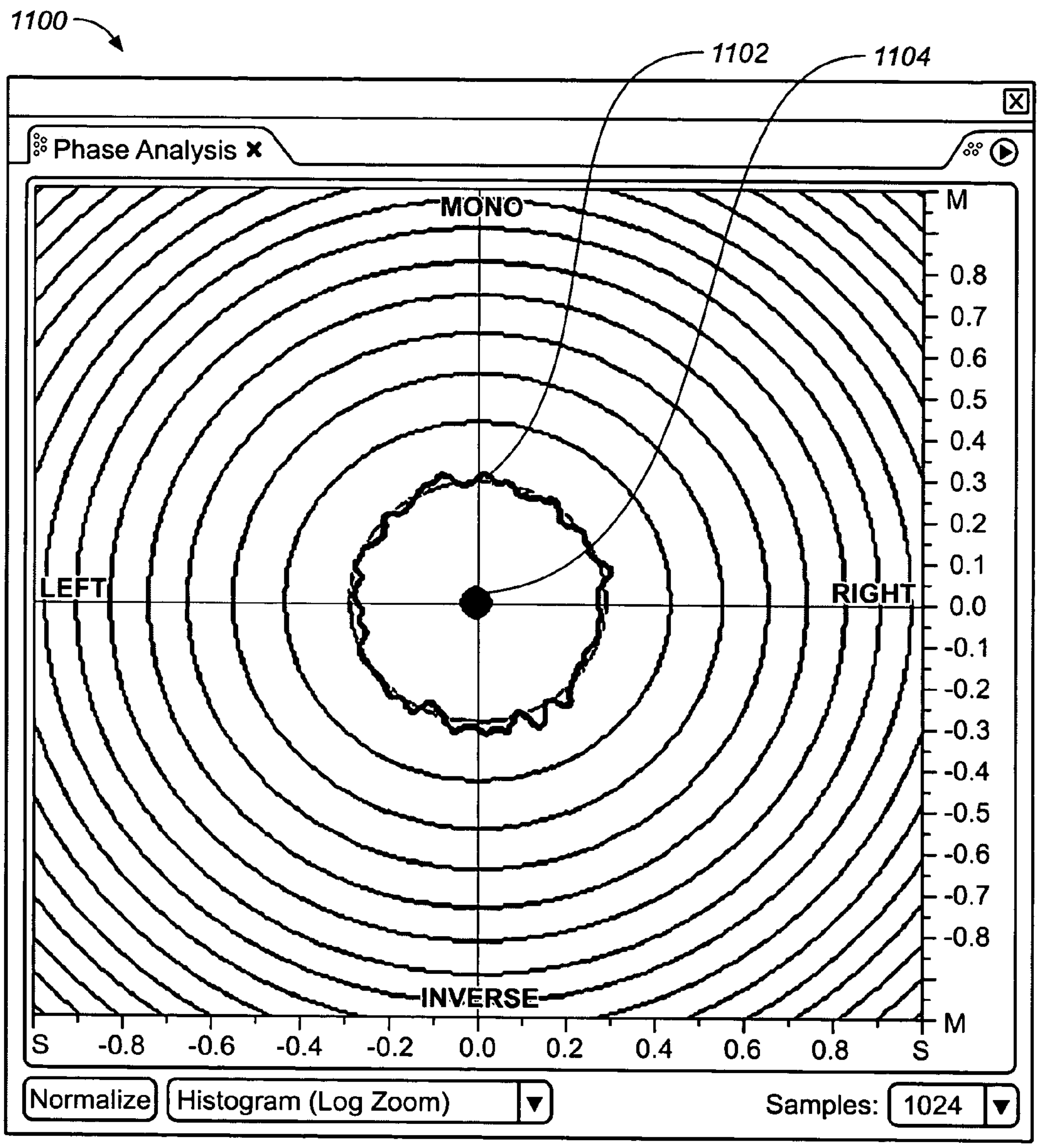

FIG. 11 shows an example stereo phase analysis display 1100. The stereo phase analysis display 1100 includes a stereo phase plot 1102. The stereo phase plot 1102 traces a roughly circular path around the innermost concentric magnitude ring. Thus, the audio data are distributed between all phase angles in roughly equal amounts. This indicates that the audio data are completely uncorrelated between audio channels, resulting in random noise. Additionally, the stereo phase plot 1102 illustrates the maximum stereo width resulting from 100 percent uncorrelated audio channels.

Figure 12:
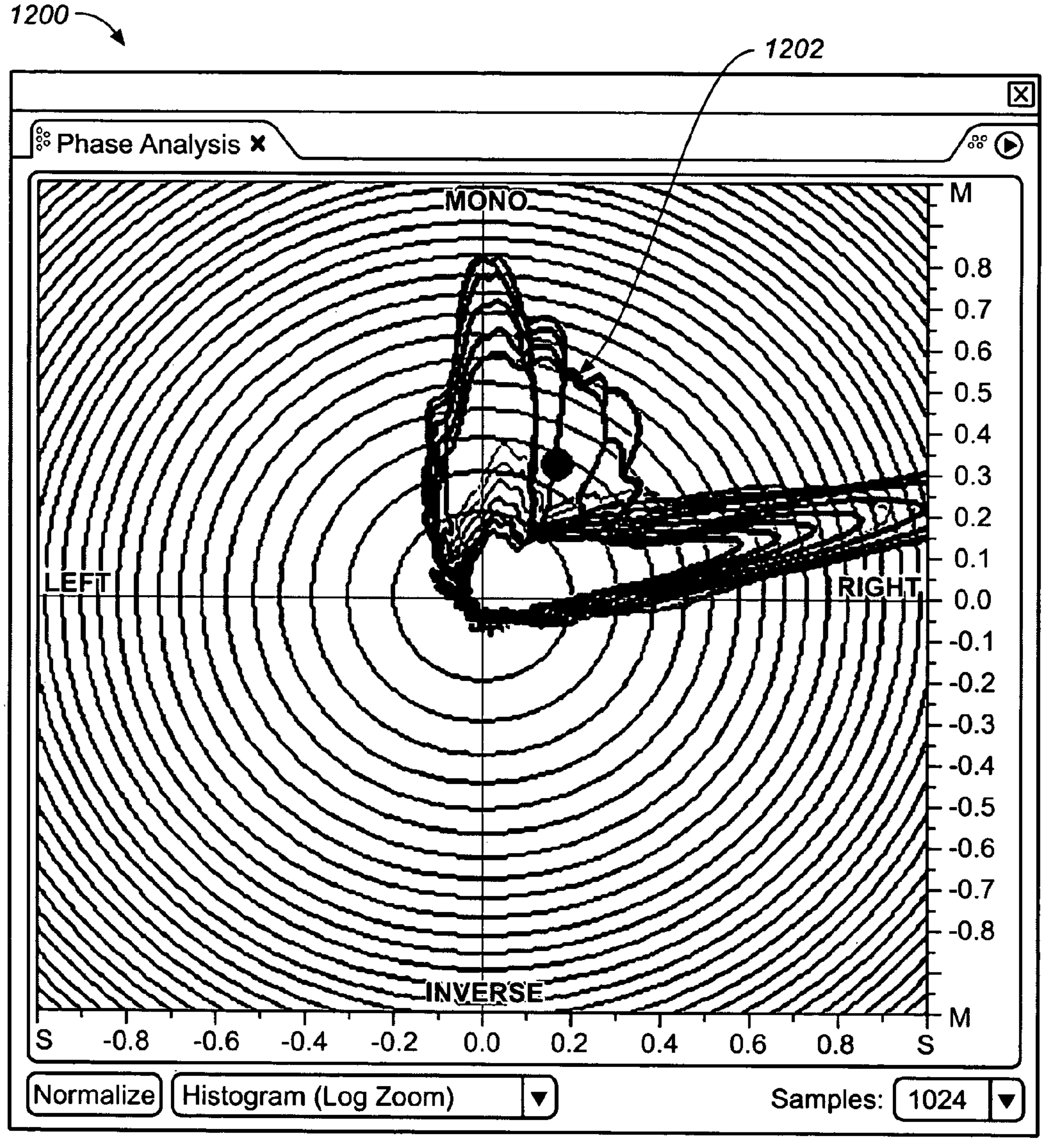
FIG. 12 shows an example stereo phase analysis display of audio data with stereo phase plot history data.

FIG. 12 shows an example stereo phase analysis display 1200 including stereo phase plot history data. In the stereo phase analysis display 1200, multiple stereo phase plots 1202 of the audio data are shown. The multiple stereo phase plots 1202 show the current stereo phase plot and a particular number of previous stereo phase plots. For example, the multiple stereo phase plots 1202 can represent consecutive 1/10 second increments of the audio data. Thus, the stereo phase analysis display 1200 provides history information allowing the user to see how the stereo phase plot changes with time. The number of stereo phase plots shown can be a predefined number or a user defined number. Too many stereo phase plots can make it difficult to interpret the audio data.

After displaying the audio data, the user can analyze or edit the audio data. The user can perform one or more editing operations on all or a portion of the audio data according to the analysis of the displayed audio data.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a computer-readable medium for execution by, or to control the operation of, data processing apparatus. The instructions can be organized into modules in different numbers and combinations from the exemplary modules described. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method, comprising:

receiving audio data;

separating the audio data into a plurality of samples;

calculating stereo phase data for each sample of the plurality of samples, where calculating the stereo phase includes calculating a phase angle and magnitude data for each sample and combining the stereo phase data for the plurality of samples for each calculated phase angle; and displaying the calculated stereo phase data, where displaying the calculated stereo phase data includes displaying the combined stereo phase data for each calculated phase angle the displaying including plotting points using a histogram count for each phase angle as a function of a number and magnitude of samples at each calculated phase angle.

2. The method of claim 1, where calculating the phase angle for the sample comprises:

calculating an inverse tangent associated with a ratio of an amplitude value of a left audio channel and an amplitude value of a right audio channel for the sample.

3. The method of claim 1, where calculating the magnitude for a sample comprises:

summing the squares of the amplitude values corresponding to a left audio channel and a right audio channel for the sample.

4. The method of claim 1, further comprising:

generating a histogram for relating phase angles with a count using the stereo phase data calculated for each sample.

5. The method of claim 4, further comprising:

displaying the generated histogram.

6. The method of claim 4, further comprising:

plotting stereo phase data using data from the generated histogram.

7. The method of claim 6, where plotting the stereo phase data includes plotting a point for each phase angle having a radius from a center of the plot defined by the corresponding histogram count.

8. The method of claim 1, further comprising:

calculating a center point for the plotted stereo phase data; and displaying a visual representation of the calculated center point.

9. The method of claim 8, where calculating the center point comprises:

calculating an average value of the plotted stereo phase data.

10. The method of claim 8, where the visual representation of the calculated center point includes an identifier indicating whether the audio data are generally in phase or out of phase.

11. The method of claim 10, where the identifier provides the visual representation of the center point with a first color if the audio data are generally in phase and a second color if the audio data are generally out of phase.

12. A computer program product, encoded on a computer-readable medium, operable to cause data processing apparatus to perform operations comprising:

receiving audio data;

separating the audio data into a plurality of samples;

calculating stereo phase data for each sample of the plurality of samples, where calculating the stereo phase data includes calculating a phase angle and magnitude for each sample and combining the stereo phase data for the plurality of samples for each calculated phase angle; and displaying the calculated stereo phase data, where displaying the calculated stereo phase data includes displaying the combined stereo phase data for each calculated phase angle the displaying including plotting points using a histogram count for each phase angle as a function of a number and magnitude of samples at each calculated phase angle.

13. The computer program product of claim 12, where calculating the phase angle for the sample comprises:

calculating an inverse tangent associated with a ratio of an amplitude value of a left audio channel and an amplitude value of a right audio channel for the sample.

14. The computer program product of claim 12, where calculating the magnitude for a sample comprises:

summing the squares of the amplitude values corresponding to a left audio channel and a right audio channel for the sample.

15. The computer program product of claim 12, further comprising:

generating a histogram for relating phase angles with a count using the stereo phase data calculated for each sample.

16. The computer program product of claim 15, further comprising:

displaying the generated histogram.

17. The computer program product of claim 15, further comprising:

plotting stereo phase data using data from the generated histogram.

18. The computer program product of claim 17, where plotting the stereo phase data includes plotting a point for each phase angle having a radius from a center of the plot defined by the corresponding histogram count.

19. The computer program product of claim 12, further comprising:

calculating a center point for the plotted stereo phase data; and displaying a visual representation of the calculated center point.

20. The computer program product of claim 19, where calculating the center point comprises:

calculating an average value of the plotted stereo phase data.

21. The computer program product of claim 19, where the visual representation of the calculated center point includes an identifier indicating whether the audio data are generally in phase or out of phase.

22. The computer program product of claim 21, where the identifier provides the visual representation of the center point with a first color if the audio data are generally in phase and a second color if the audio data are generally out of phase.

23. A system comprising:

means for receiving audio data;

means for calculating stereo phase data for a plurality of samples, the stereo phase data comprising one or more phase angles and associated magnitudes, where calculating the stereo phase data includes calculating a phase angle and magnitude for each sample and combining the stereo phase data for the plurality of samples for each calculated phase angle; and means for displaying the calculated stereo phase data, where displaying the calculated stereo phase data includes displaying the combined stereo phase data for each calculated phase angle the displaying including plotting points using a histogram count for each phase angle as a function of a number and magnitude of samples at each calculated phase angle.

24. The system of claim 23, where means for calculating the phase angle for the sample comprises:

means for calculating an inverse tangent associated with a ratio of an amplitude value of a left audio channel and an amplitude value of a right audio channel for the sample.

25. The system of claim 23, where means for calculating the magnitude for a sample comprises:

means for summing the squares of the amplitude values corresponding to a left audio channel and a right audio channel for the sample.

26. The system of claim 23, further comprising:

means for calculating a center point for the plotted stereo phase data; and means for displaying a visual representation of the calculated center point.

27. The system of claim 26, where the means for calculating the center point comprises:

means for calculating an average value of the plotted stereo phase data.

28. The system of claim 26, where the visual representation of the calculated center point includes an identifier indicating whether the audio data are generally in phase or out of phase.

29. The system of claim 28, where the identifier provides the visual representation of the center point with a first color if the audio data are generally in phase and a second color if the audio data are generally out of phase.

30. A system comprising:

a graphical user interface configured to present a display of audio data, including:

a stereo field representing stereo phase between two or more audio channels as a function of phase angle; and a plot of stereo phase including a plot of one or more phase angles and one or more magnitudes calculated using a plurality of samples of the audio data, where calculating each point on the plot includes calculating a histogram count for each phase angle as a function of a number and magnitude for each sample including combining magnitudes for the plurality of samples for each calculated phase angle.

31. The system of claim 30, further comprising:

generating a histogram for relating phase angles with a count using the stereo phase data calculated for each sample.

32. The system of claim 30, further comprising:

means for displaying the generated histogram.

33. The system of claim 30, further comprising:

means for plotting stereo phase data using data from the generated histogram.

34. The system of claim 33, where means for plotting the stereo phase data includes means for plotting a point for each phase angle having a radius from a center of the plot defined by the corresponding histogram count.

35. A computer program product, encoded on a computer-readable medium, operable to cause data processing apparatus to perform operations comprising:

displaying audio data on a graphical user interface, including:

representing stereo phase between two or more audio channels as a function of phase angle in a stereo field; and plotting a stereo phase including plotting one or more phase angles and one or more magnitudes calculated using a plurality of samples of the audio data, where calculating each point on the plot includes calculating a histogram count for each phase angle as a function of a number and magnitude for each sample including combining magnitudes for the plurality of samples for each calculated phase angle.

36. A computer-implemented method comprising:

displaying audio data on a graphical user interface, including:

representing stereo phase between two or more audio channels as a function of phase angle in a stereo field; and plotting a stereo phase including plotting one or more phase angles and one or more magnitudes calculated using a plurality of samples of the audio data, where calculating each point on the plot includes calculating a histogram count for each phase angle as a function of a number and magnitude for each sample including combining magnitudes for the plurality of samples for each calculated phase angle.

* * * * *

UNITED STATES PATENT AND TRADEMARK OFFICE

CERTIFICATE OF CORRECTION

PATENT NO. : 7,610,110 B1
APPLICATION NO. : 11/445823
DATED : October 27, 2009
INVENTOR(S) : Johnston It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 442 days Delete the phrase "by 442 days" and insert -- by 589 days --

Signed and Sealed this

Eleventh Day of May, 2010

David J. Kappos

David J. Kappos
*Director of the United States Patent and Trademark Office*